(12) United States Patent
Johnson

(10) Patent No.: US 7,342,493 B2
(45) Date of Patent: Mar. 11, 2008

(54) MOTION DETECTOR

(75) Inventor: Dennis J. Johnson, Salem, NH (US)

(73) Assignee: UltraVision Security Systems, Inc., Salem, NH (US)

( * ) Notice: Subject to any disclaimer, the term of this patent is extended or adjusted under 35 U.S.C. 154(b) by 0 days.

(21) Appl. No.: 11/408,461

(22) Filed: Apr. 21, 2006

(65) Prior Publication Data

US 2007/0057761 A1    Mar. 15, 2007

Related U.S. Application Data

(60) Provisional application No. 60/673,916, filed on Apr. 22, 2005.

(51) Int. Cl.
*G08B 13/00* (2006.01)

(52) U.S. Cl. .............. 340/541; 340/539.16; 340/552; 340/565; 342/27; 342/28

(58) Field of Classification Search .......... 340/541, 340/552, 540, 573.1, 565, 545.8, 545.9, 553, 340/561, 566, 309.16, 539.16; 342/27, 28
See application file for complete search history.

(56) References Cited

U.S. PATENT DOCUMENTS

| | | | |
|---|---|---|---|
| 6,218,979 B1 * | 4/2001 | Barnes et al. | 342/28 |
| 6,518,915 B2 * | 2/2003 | Schutz et al. | 342/28 |
| 6,989,742 B2 * | 1/2006 | Ueno et al. | 340/511 |
| 7,233,243 B2 * | 6/2007 | Roche et al. | 340/540 |
| 2007/0205937 A1 * | 9/2007 | Thompson et al. | 342/22 |

* cited by examiner

*Primary Examiner*—Davetta W. Goins
(74) *Attorney, Agent, or Firm*—Madan, Mosmsan & Sriram, P.C.

(57) ABSTRACT

According to various illustrative embodiments, a motion-monitoring system comprises at least one antenna fixed within a barrier, the at least one antenna transmitting at least one first radio-frequency signal through the barrier to at least one volume outside the barrier, the at least one first radio-frequency signal reflecting from at least one object in the at least one volume to produce a plurality of second radio-frequency signals, which are received by the at least one antenna, at least one sensing circuit sensing the plurality of second radio-frequency signals and generating a plurality of time-domain output signals, and at least one processor receiving the plurality of time-domain output signals and comparing at least one successive time-domain output signal to at least one previous time-domain output signal to estimate at least one characteristic of the at least one object, including a motion of the at least one object.

20 Claims, 5 Drawing Sheets

MOTION DETECTOR

CROSS-REFERENCE TO RELATED APPLICATIONS

This application relates to, and claims priority from, U.S. Provisional Patent Application No. 60/673,916, titled "Motion Detector," filed on Apr. 22, 2005, the entire contents of which are hereby incorporated herein by reference.

TECHNICAL FIELD OF THE INVENTION

The present disclosure relates generally to devices, systems, and methods for security systems. More particularly, the present disclosure describes a device, a system, and a method for using implantable sensors to detect moving objects in an area.

BACKGROUND OF THE INVENTION

A multitude of instances exist wherein it is desirable to implement a monitoring system for a given area. Such an area may be of any size and may include structures, facilities supporting the structures, infrastructures, grounds within a defined perimeter, outer perimeter grounds and structures, roadways, and the like. In many cases, it is desirable to monitor motion.

The typical motion sensor is a rather simple line-of-sight (LOS) sensor that may emit a signal or light beam. When motion in the monitored area reaches a predetermined threshold, the sensor provides an output to a monitor that may, in turn, set off an alarm or summon assistance. Other motion sensors operate on pressure. Some use a perturbation of air pressure as the sensed characteristic, while others use contact pressure as in floor sensors. These typical sensors suffer from several drawbacks. Line-of-sight (LOS) sensors are limited by objects obstructing the line-of-sight (LOS). Furthermore, these sensors are, by necessity, visible within the monitored area and can be defeated. Air pressure sensors are limited by obstructions and may not detect very slight or slow movements. Implanted pressure sensors are limited by a small sensitivity area on which contact must be made and cannot detect general movement in the monitored area. All such sensors suffer from the inability to detect other characteristics of a moving object such as distance to the motion and velocity of the motion.

SUMMARY OF THE INVENTION

There is a need for non-line-of-sight motion detectors that can distinguish multiple characteristics of a moving target within a monitored area.

The present disclosure addresses some or all of the drawbacks discussed above by providing an implantable motion detector for detecting moving objects and distinguishing parameters of the object.

In accordance with the present disclosure, a device, a system, and a method for using implantable sensors to detect moving objects in an area are disclosed. In one aspect, a motion-monitoring apparatus at least one antenna fixed within a barrier, the at least one antenna transmitting at least one first radio-frequency signal through the barrier to at least one volume outside the barrier, the at least one first radio-frequency signal reflecting from at least one object in the at least one volume to produce a plurality of second radio-frequency signals, the plurality of second radio-frequency signals being received by the at least one antenna. The motion-monitoring apparatus also comprises at least one sensing circuit sensing the plurality of second radio-frequency signals, the at least one sensing circuit generating a plurality of time-domain output signals. The motion-monitoring apparatus also comprises at least one processor receiving the plurality of time-domain output signals, the at least one processor comparing at least one successive time-domain output signal to at least one previous time-domain output signal to estimate at least one characteristic of the at least one object, the at least one characteristic including a motion of the at least one object. The motion-monitoring apparatus also comprises at least one monitor device remotely disposed from the at least one antenna, the at least one monitor device monitoring the at least one characteristic.

In various aspects, the motion-monitoring apparatus may further comprise having the at least one sensing circuit include at least one ultra-wideband sensing circuit. In these various aspects, the motion-monitoring apparatus may further comprise having the plurality of time-domain output signals generated using a sample-down process. In various aspects, the motion-monitoring apparatus may further comprise having the at least one antenna comprise a single antenna, the motion-monitoring apparatus further comprising at least one controllable switch switching the single antenna between a transmitting mode and a receiving mode. In various aspects, the motion-monitoring apparatus may further comprise having the at least one antenna include a first antenna and a second antenna, the first antenna operating in a transmitting mode, the second antenna operating in a receiving mode. In various aspects, the motion-monitoring apparatus may further comprise having the at least one sensing circuit collocated with the at least one antenna within the barrier. In various aspects, the motion-monitoring apparatus may further comprise having the barrier comprise at least one building member. In these various aspects, the motion-monitoring apparatus may further comprise having the at least one building member comprise at least one of a wall, a floor, and a roof. In various aspects, the motion-monitoring apparatus may further comprise having the barrier comprise at least one in-ground barrier. In these various aspects, the motion-monitoring apparatus may further comprise having the at least one in-ground barrier include at least one of a natural earth ground material, asphalt, concrete, wood, water, drywall, and brick.

In various aspects, the motion-monitoring apparatus may further comprise having the at least one characteristic comprise a plurality of characteristics, the plurality of characteristics further including at least one of a size of the at least one object, a type of the at least one object, a speed of the at least one object, a location of the at least one object, and a direction of movement of the at least one object. In various aspects, the motion-monitoring apparatus may further comprise at least one visual display device providing at least one visual output representative of the at least one characteristic. In various aspects, the motion-monitoring apparatus may further comprise having the at least one sensing circuit include at least one ultra-wideband sensing circuit and having at least one visual display device providing at least one visual output representative of the at least one characteristic. In various aspects, the motion-monitoring apparatus may further comprise having the at least one antenna comprise at least three antenna sets, each of the at least three antenna sets spaced apart from others of the at least three antenna sets, the at least one first radio-frequency signal comprises a plurality of first radio-frequency signals, and each of the at least three antenna sets transmitting a respective one of the plurality of first radio-frequency signals into the at least one volume and receiving a respective one of the plurality of second radio-frequency signals to provide at least one triangulation for estimating the at least one characteristic.

In another aspect, a motion-monitoring system comprises at least one sensor set including at least one antenna fixed within a barrier, the at least one antenna transmitting at least one first radio-frequency signal through the barrier to at least one volume outside the barrier, the at least one first radio-frequency signal reflecting from at least one object in the at least one volume to produce a plurality of second radio-frequency signals, the plurality of second radio-frequency signals being received by the at least one antenna, the at least one sensor set including at least one sensing circuit sensing the plurality of second radio-frequency signals, the at least one sensing circuit generating a plurality of time-domain output signals. The motion-monitoring system also comprises at least one processor receiving the plurality of time-domain output signals, the at least one processor comparing at least one successive time-domain output signal to at least one previous time-domain output signal to at least one of estimate at least one characteristic of the at least one object and distinguish at least one characteristic of the at least one object, the at least one characteristic including a motion of the at least one object. The motion-monitoring system also comprises at least one monitoring station remotely disposed from the at least one sensor set, the at least one monitor station monitoring the at least one characteristic. The motion-monitoring system also comprises at least one visual display device providing at least one visual output representative of the at least one characteristic.

In various aspects, the motion-monitoring system may further comprise having the at least one volume is a plurality of volumes separated from each other, the at least one sensor set comprises a plurality of sensor sets, the at least one first radio-frequency signal comprises a plurality of first radio-frequency signals, the at least one sensing circuit comprises a plurality of sensing circuits, each of the plurality of volumes including a respective one of the plurality of sensor sets, the respective at least one antenna fixed within the respective barrier transmitting the respective one of the plurality of first radio-frequency signals and receiving the respective one of the plurality of second radio-frequency signals, and the respective one of the plurality of sensing circuits generating a plurality of time-domain output signals related to the respective one of the plurality of volumes, the motion-monitoring system further comprising a plurality of communication links, each of the plurality of communication links associated with the respective one of the plurality of sensing circuits for transmitting the respective plurality of time-domain output signals, a hub receiving each of the respective plurality of time-domain output signals, and a central communication link transmitting the respective plurality of time-domain output signals from the hub to the monitoring station. In various aspects, the motion-monitoring system may further comprise having the barrier comprise at least one roadway, the at least one object comprises a plurality of objects, and the at least one monitored characteristic comprises at least one traffic pattern. In these various aspects, the motion-monitoring system may further comprise having the plurality of objects include at least one of a plurality of vehicles and a plurality of pedestrians.

In yet another aspect, a method of motion-monitoring comprises transmitting at least one first radio-frequency signal through a barrier to at least one volume outside the barrier using at least one antenna fixed within the barrier, the at least one first radio-frequency signal reflecting from at least one object in the at least one volume to produce a plurality of second radio-frequency signals. The method of motion-monitoring also comprises receiving the plurality of second radio-frequency signals with the at least one antenna. The method of motion-monitoring also comprises generating a plurality of time-domain output signals using at least one sensing circuit sensing the plurality of second radio-frequency signals. The method of motion-monitoring also comprises comparing at least one successive time-domain output signal to at least one previous time-domain output signal to estimate at least one characteristic of the at least one object using at least one processor receiving the plurality of time-domain output signals, the at least one characteristic including a motion of the at least one object. The method of motion-monitoring also comprises monitoring the at least one characteristic using at least one monitor device remotely disposed from the at least one antenna. In various aspects, the method of motion-monitoring may further comprise having the at least one antenna comprise at least three antenna sets, each of the at least three antenna sets spaced apart from others of the at least three antenna sets, the at least one first radio-frequency signal comprises a plurality of first radio-frequency signals, the method of motion-monitoring further comprising transmitting a respective one of the plurality of first radio-frequency signals into the at least one volume, and receiving a respective one of the plurality of second radio-frequency signals using a respective one of the at least three antenna sets to provide at least one triangulation for estimating the at least one characteristic.

BRIEF DESCRIPTION OF THE DRAWINGS

The following figures form part of the present specification and are included to further demonstrate certain aspects of the present claimed subject matter, and should not be used to limit or define the present claimed subject matter. The present claimed subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which the leftmost significant digit(s) in the reference numerals denote(s) the first figure in which the respective reference numerals appear, wherein:

It is to be noted, however, that the appended drawings illustrate only typical embodiments of the present claimed subject matter and are, therefore, not to be considered limiting of the scope of the present claimed subject matter, as the present claimed subject matter may admit to other equally effective embodiments.

DETAILED DESCRIPTION OF ILLUSTRATIVE EMBODIMENTS

Illustrative embodiments of the present claimed subject matter are described in detail below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of the present disclosure.

Figure 1:
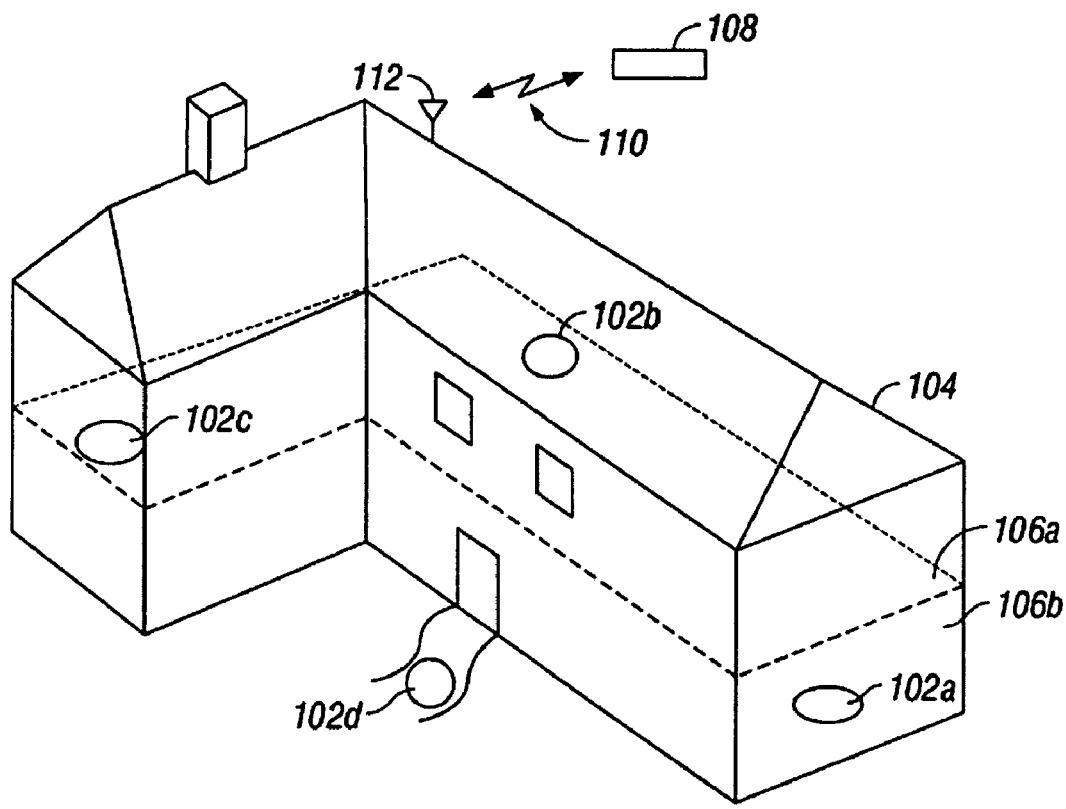
FIG. 1 schematically illustrates an elevation view of a structure having a motion-monitoring motion detector system as in various illustrative embodiments, according to the present disclosure.

FIG. 1 schematically illustrates an elevation view of a structure 104 having an implantable motion-monitoring motion detector system 100 as in various illustrative embodiments, according to the present disclosure. The motion-monitoring system 100 may include one or more detectors 102a, 102b, 102c, 102d, a command, control, and monitoring station 108 remotely located from the detectors 102a, 102b, 102c, 102d, and a communication link 110 communicating information between one or more sensor sets, such as the detectors 102a, 102b, 102c, 102d, and the monitoring station 108. As shown in FIG. 1, the detectors 102a, 102b, 102c, 102d, may be implanted and/or buried within a barrier such as the ground, floors, walls, and/or roof of the structure 104. The communication link 110 may be wireless, as shown in FIG. 1, for example, using an antenna 112 to transmit signals from the structure 104 to the remotely-located command, control, and station 108.

Figure 2:
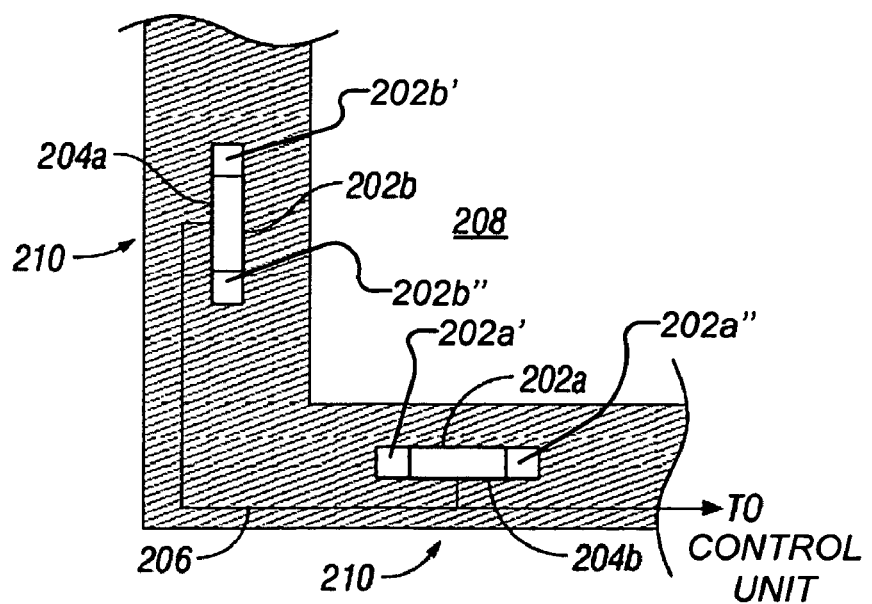
FIG. 2 schematically illustrates a motion-monitoring motion detector implanted within a material as in various illustrative embodiments, according to the present disclosure.

FIG. 2 schematically illustrates a motion-monitoring motion detector 210 implanted and/or buried within a material barrier 200 as in various illustrative embodiments, according to the present disclosure. Referring to FIG. 1 and FIG. 2, each of the detectors 102a, 102b, 102c, 102d, may comprise the motion detector 210 that includes a plurality of antennas 202a, 202b. The antennas 202a, 202b may be are buried in the barrier 200 to avoid aesthetic drawbacks of visual sensors and/or to hide the antennas 202a, 202b from view. The barrier 200 may be any suitable type of barrier, such as the ground, floors, walls, and/or roof of the structure 104. As shown in FIG. 2, for example, the barrier 200 is a building member. As used herein, the term "building member" may include any member used to construct a man-made structure, such as the structure 104. The building member may be a floor, wall, ceiling, roof, staircase, facade and/or any other structural and/or non-structural component of a structure, such as the structure 104.

The antennas 202a, 202b may include one or more transmitting antennas 202a', 202b' to transmit a radio-frequency (RF) signal into at least one volume 208 that is to be monitored and one or more receiving antennas 202a'', 202b'' to receive the returning radio-frequency (RF) signals from the volume 208. The transmitted radio-frequency (RF) signal may reflect from one or more objects within the volume 208 and return as secondary radio-frequency (RF) signals ("echoes") to be received by one or more of the receiving antennas 202a'', 202b''. In various illustrative embodiments, the transmitting and receiving antennas 202a, 202b may be implemented as single antennas being electronically switched from a transmitting mode to a receiving mode, for example. In various alternative illustrative embodiments the transmitting and receiving antennas 202a, 202b may be implemented by separate transmitting antennas 202a', 202b' and receiving antennas 202a'', 202b''. An electrical sensing circuit 204a, 204b may be coupled to the respective antennas 202a, 202b to operate as a timing and control device for transmitting and receiving. Data and/or power may be communicated to and/or from the sensing circuit 204a, 204b and antennas 202a, 202b via a link 206, which may comprise one or more wire conductors, fiber optics, and/or electromagnetic linking. The link 206 may provide communication to and/or from the buried detectors 102a, 102b, 102c, 102d from and/or to the communications link 110, for example.

In various illustrative embodiments, the detectors 102a, 102b, 102c, 102d may include one or more ultra-wideband sensing circuits (UWB detectors). One such detector is described in U.S. Pat. No. 6,518,915 to Schutz et al. for "Impulse Radar Security System," the entire contents of which are incorporated by reference herein. An ultra-wideband (UWB) signal is commonly used in ground-penetrating radar systems to obtain measurements of subsurface stationary structures and/or provide images of the internal structure of opaque materials such as soil, rock, concrete, asphalt, and/or wood. Ultra-wideband (UWB) signals are generally defined as signals whose bandwidth is at least 25% of the nominal center frequency. With ground-penetrating radar, very short bursts of radio-frequency (RF) energy are emitted into the ground and echoes from buried targets are received in return. Ultra-wideband (UWB) technology may detect targets underground and, as described herein, through walls and/or floors and the like of structures such as the structure 104, for example.

The radio-frequency (RF) energy used in the motion-monitoring system 100 may take several forms. In various illustrative embodiments, radio-frequency (RF) energy in the form of an impulse may be employed, for example. The impulse may last from about 0.1 nanoseconds to about 10 nanoseconds, for example. The actual waveform may be one or two cycles or so of a damped sinusoid, for example. The motion-monitoring system 100 may operate in the time domain. Time-domain signals and/or echoes may typically travel about 1 nanosecond per foot in air (for one-way travel) and time-domain signals returning to the antennas 202a, 202b after striking a target may arrive at different times depending on the target's distance from the transmitting antennas 202a', 202b', for example. Consequently, the distance of an object causing a reflected echo may be estimated and/or distinguished and/or determined by the particular delay in the echo return. For example, an object at a distance of about 10 feet may return an echo in about 20 nanoseconds, while an object about 20 feet away may return an echo in about 40 nanoseconds.

An ultra-wideband (UWB) signal may provide an improved resolution/penetration tradeoff. Lower frequency signals, approximately 100 MHz to about 500 MHz, for example, may penetrate farther, especially when they are transmitted into the ground or a wall of a structure such as the structure 104, for example. However, resolution may deteriorate with the use of lower frequency signals. Since resolution may be a function of the total length of a radio-frequency (RF) burst, having fewer numbers of cycles of a waveform may minimize this resolution deterioration.

For example, having one or two or so cycles in an impulse may result in a better resolution for a particular selected frequency, with the result that a preferred radio-frequency (RF) signal may have an ultra-wideband (UWB) bandwidth.

Figure 4:
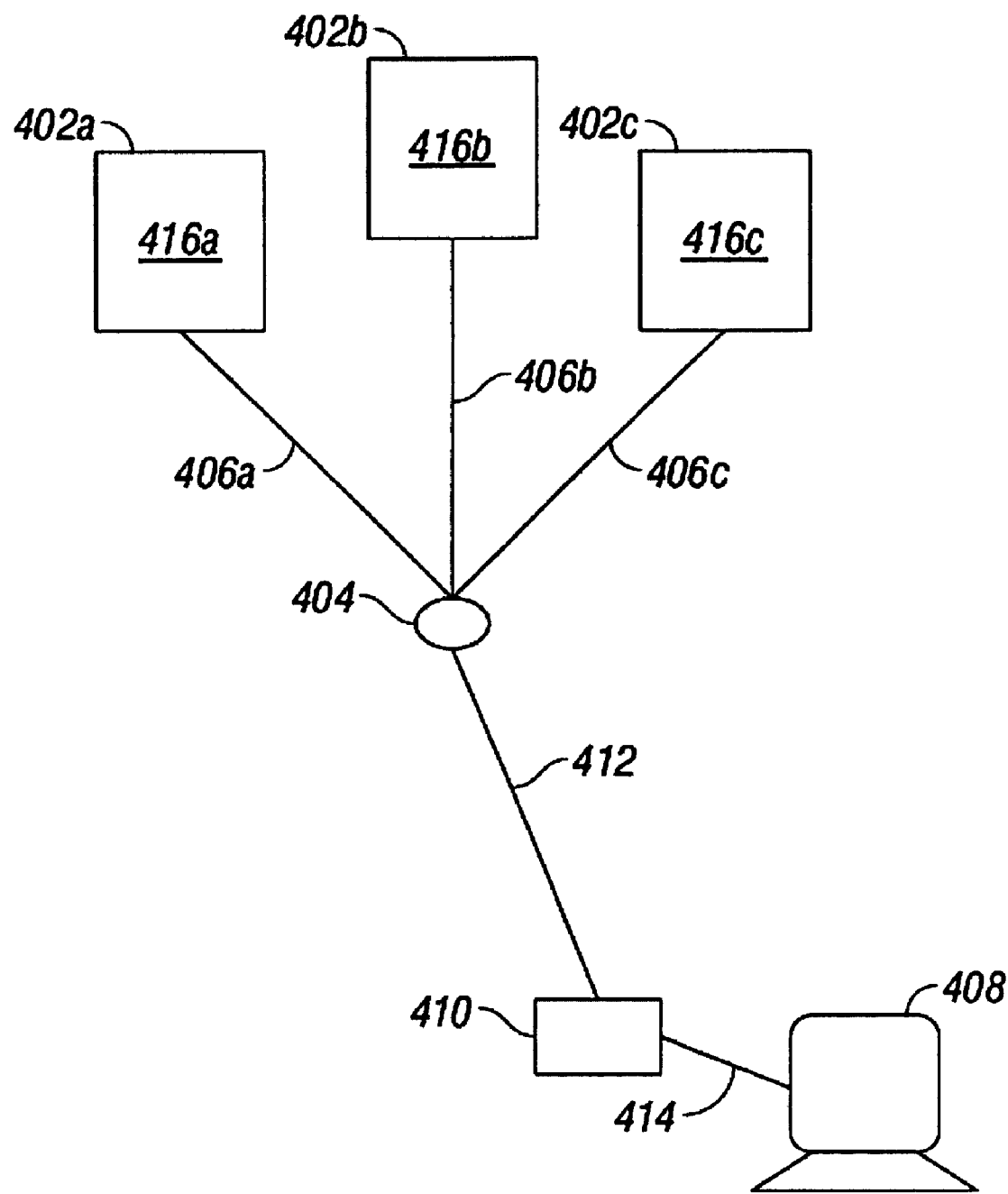
FIG. 4 schematically illustrates a networked motion-monitoring motion detector system as in various illustrative embodiments, according to the present disclosure.

In various illustrative embodiments, at least one return radio-frequency (RF) signal, the echo, for example, received by the receiving antennas 202a", 202b" may be applied to a very high-speed sample-hold circuit within the sensing circuit 204a, 204b. The sample-hold circuit may output at least one sampled or low-frequency signal to a control unit, such as a computer 408, as shown in FIG. 4, for example. The sampled or low-frequency signal is proportional to the return radio-frequency (RF) signal at a sequence of points in its waveform. Subsequent samples may be taken at different points in subsequent waveforms of the secondary return radio-frequency (RF) signal. This process is called down-sampling or a sample-down process. The result may be the creation of a duplicate radio-frequency (RF) signal at a significantly lower frequency, typically within the audio-frequency spectrum, than the frequency of either the first or primary radio-frequency (RF) signal, transmitted by the transmitting antennas 202a', 202b', or the second or secondary radio-frequency (RF) signal, received by the receiving antennas 202a", 202b", for example. This audio-frequency waveform or down-sampled signal may provide for more efficient processing of the signal by the control unit, such as the computer 408.

Figure 3A:
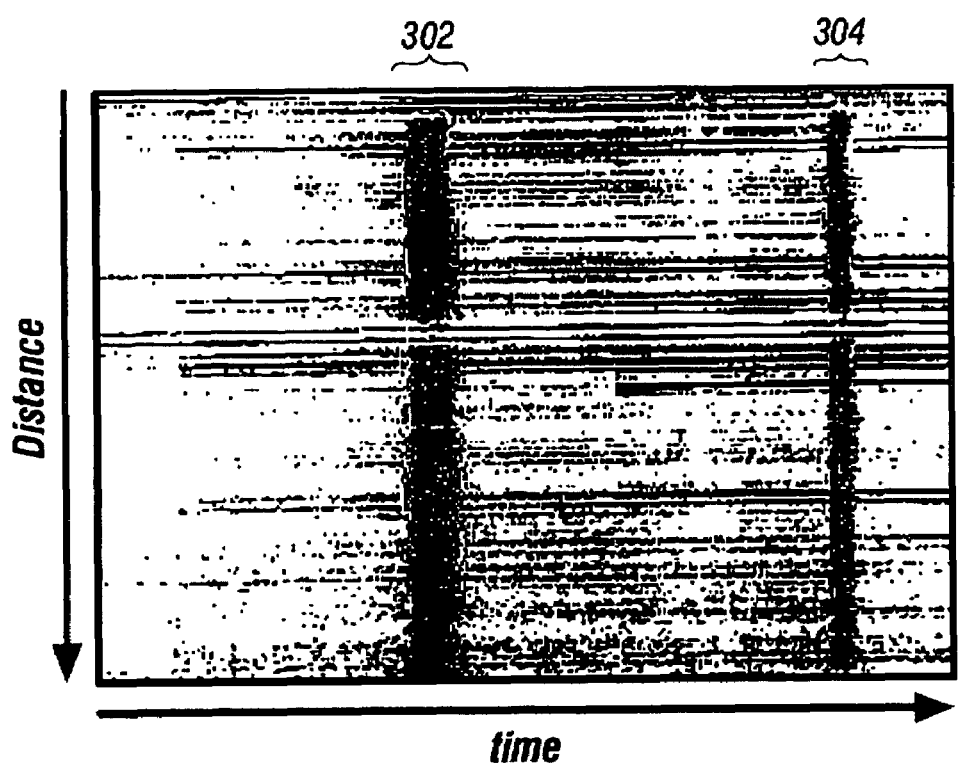
FIGS. 3A and 3B schematically illustrate and depict exemplary monitor outputs from various illustrative embodiments, according to the present disclosure.
Figure 3B:
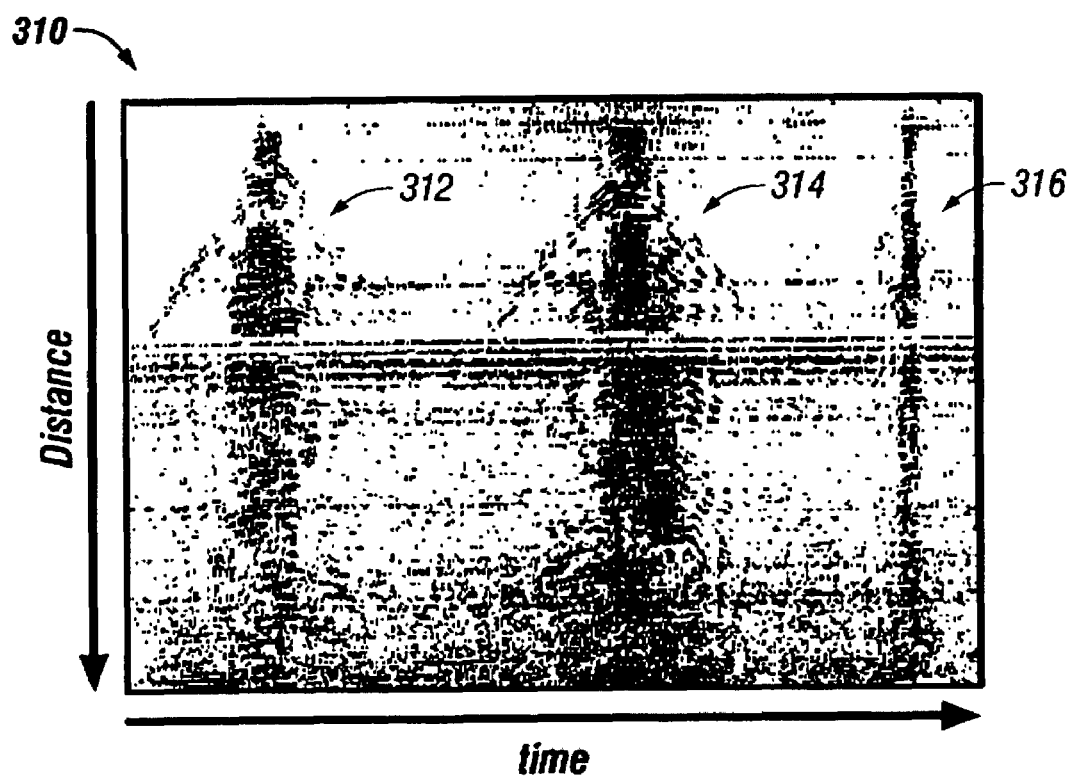

FIGS. 3A and 3B schematically illustrate and depict exemplary monitor outputs from various illustrative embodiments, according to the present disclosure. FIGS. 3A and 3B are experienced-based visual output samples according to the present disclosure. FIG. 3A shows an actual output 300 from a motion-monitoring sensor system 100 as in various illustrative embodiments, according to the present disclosure. The output 300 represents a vehicle traveling first at about 5 miles per hour (mph), as shown at 302, and then at about 20 miles per hour (mph), as shown at 304. Note that the width of the return is dense in both cases 302, and 304. This dense return may be indicative and/or characteristic of a metal vehicle, for example. Furthermore, the characteristic of the size of the vehicle may be estimated, distinguished, and/or determined using the estimated speed and the size of the return, for example. The vehicle used in the example as shown in FIG. 3A was be an automobile, for example.

FIG. 3B shows an actual output 310 of a motion-monitoring sensor system 100 as in various illustrative embodiments, according to the present disclosure. The output 310 represents an output return obtained using a human subject walking toward a motion-monitoring sensor system 100 as in various illustrative embodiments, according to the present disclosure, as shown at 312, walking away from the motion-monitoring sensor system 100, as shown at 314, and then running away from the motion-monitoring sensor system 100., as shown at 316. In each case 312, 314, and 316, the motion-monitoring sensor system 100 was buried in the ground under an asphalt roadway. Similar results would be seen if the motion-monitoring sensor system 100 were to be buried in dirt, in concrete, and/or under some other barrier material. A "barrier" as used herein means a material and/or structure penetrable by radio-frequency (RF) signals. The term as used herein may include opaque materials, soil, rock, concrete, asphalt, and/or wood. It is further intended that the term "barrier" may include structures partially penetrable by radio-frequency (RF) signals. For example, a building wall having a metal framework may be partially penetrable by radio-frequency (RF) signals. An implanted motion-monitoring sensor system 100 as in various illustrative embodiments, according to the present disclosure, may operate satisfactorily through the portion of the material that is not metallic.

FIG. 4 schematically illustrates a networked motion-monitoring motion detector system 400 as in various illustrative embodiments, according to the present disclosure. Shown is the networked motion-monitoring motion detector system 400 that may include one or more sensor sets 416a, 416b, 416c, each sensor set 416a, 416b, 416c used to sense motion in a respective area 402a, 402b, 402c. Each sensor set 416a, 416b, 416c may include one or more implanted motion-monitoring motion sensors and/or motion detectors 102a, 102b, 102c, 102d, 210, substantially as described above and shown in FIG. 1 and FIG. 2, for example.

The central control and monitoring station 408, which may be the computer 408, as shown in FIG. 4, for example, may be in a remote location with respect to the areas 402a, 402b, 402c. One example may be the security control center 408 where the areas 402a, 402b, 402c are multiple rooms of a facility. A hub or router 404 may control information flow from each area 402a, 402b, 402c via area links 406a, 406b, 406c. Communication between the control and monitoring station 408 and the sensor sets 416a, 416b, 416c may be accomplished, for example, with one or more communication links 412, 414, between the hub 404 and a separate communication system 410, and between the separate communication system 410, and the control and monitoring station 408, respectively. The separate communication system 410 may be implemented to separate the communication from the monitored area network 400 and other communications for the facility, for example.

The signals from each sensor and/or each sensor set sent into the volume may form spatially overlapping signals such that each return signal to a respective sensing circuit may be processed and/or compared to signals returning to other sensors and/or each sensor sets. In this manner, using at least three sensor sets may provide one or more triangulations on a moving target, which triangulation may enable a process for estimating, distinguishing, and/or determining location and/or direction of movement. Sensors located in a plane may provide planar triangulation, for example. Absolute elevation may be estimated, distinguished, and/or determined by processing the return signals along with known orientation of the sensors within the barrier and known distances between the sensors, for example. Actual elevation of the target may be estimated, distinguished, and/or determined using a fourth sensor set located out of plane with respect to the other co-planar sensors, for example. Where the plane of motion is fixed, such as floors of buildings and/or roads and/or roadways, only three sensors may be required to have three-dimensional (3D) motion tracking. The plane formed by the three sensors intersect the physical plane (floor, road, roadway, and the like) at an acute angle, for example.

Figure 5:
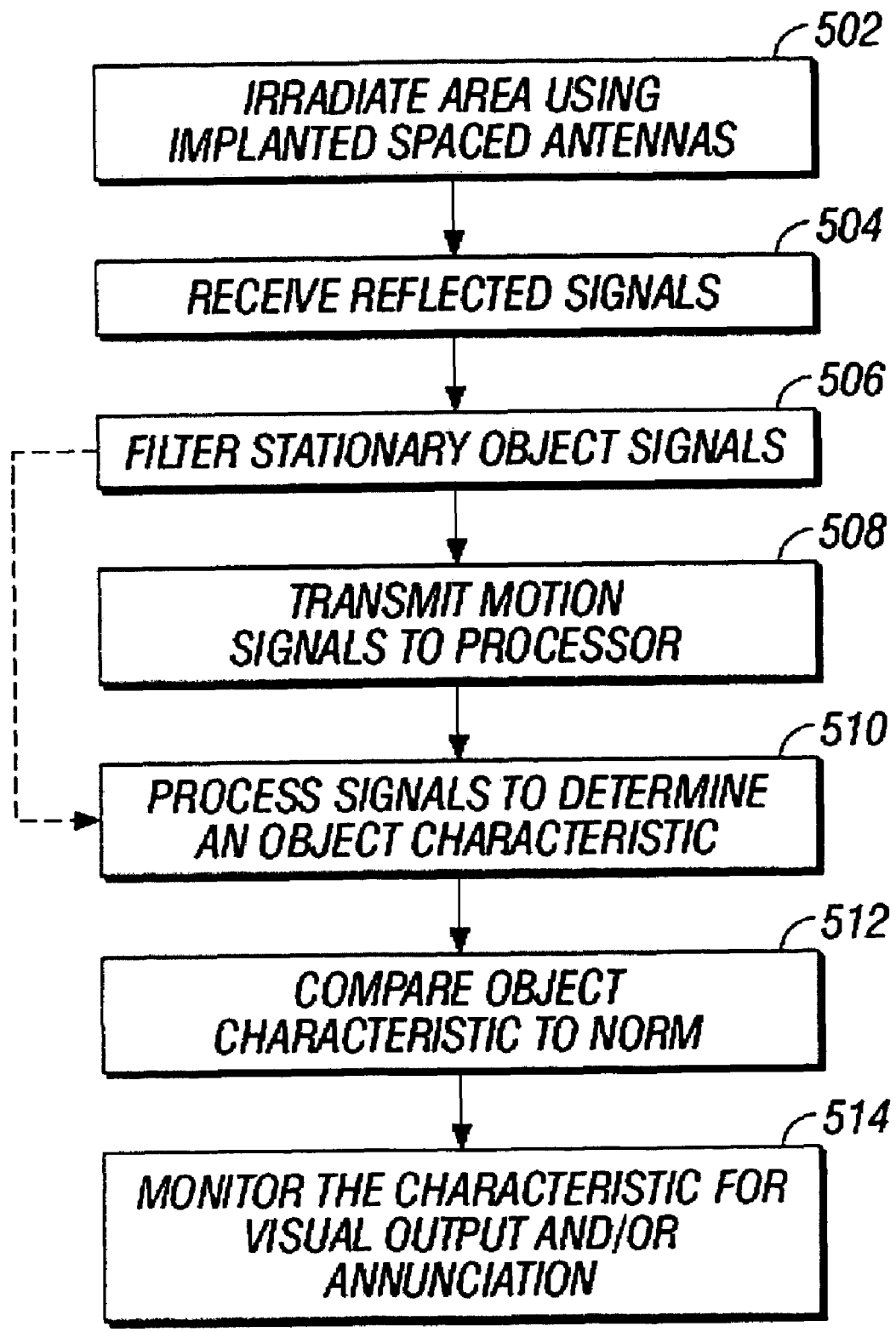
FIG. 5 schematically illustrates a flow chart depicting various illustrative embodiments of a method of motion-monitoring, according to the present disclosure.

FIG. 5 schematically illustrates a flow chart depicting various illustrative embodiments of a method 500 of motion-monitoring, according to the present disclosure. The method 500 may include irradiating 502 an area with radio-frequency (RF) signals using one or more antennas implanted in a barrier. Reflected radio-frequency (RF) signals may be received 504 by one or more antennas implanted within the barrier. Reflected signals representing one or more stationary objects may be filtered out 506 to leave signals representing one or more moving objects. Motion signals may be transmitted 508 to one or more processors. The signals may be processed 510 to estimate, distinguish, and/or determine one or more characteristics of the one or more objects.

Optionally, the removal 506 of stationary object signals may be performed in the processing 510. Optionally, the one or more characteristics may be compared 512 to one or more norms, and the one or more object characteristics may be monitored and/or transmitted for visual output and/or display and/or annunciation 514.

In several of the various illustrative embodiments, processing may be used to estimate, distinguish, and/or determine several characteristics of the one or more objects. The characteristics may include object size, type, direction of movement, location within the monitored area, velocity, and/or speed, and the like. Suitable devices that may be used for monitoring according to various illustrative embodiments of the method 500 may be substantially as described above and/or as shown in FIG. 1, FIG. 2, and/or FIG. 4, for example.

Figure 6:
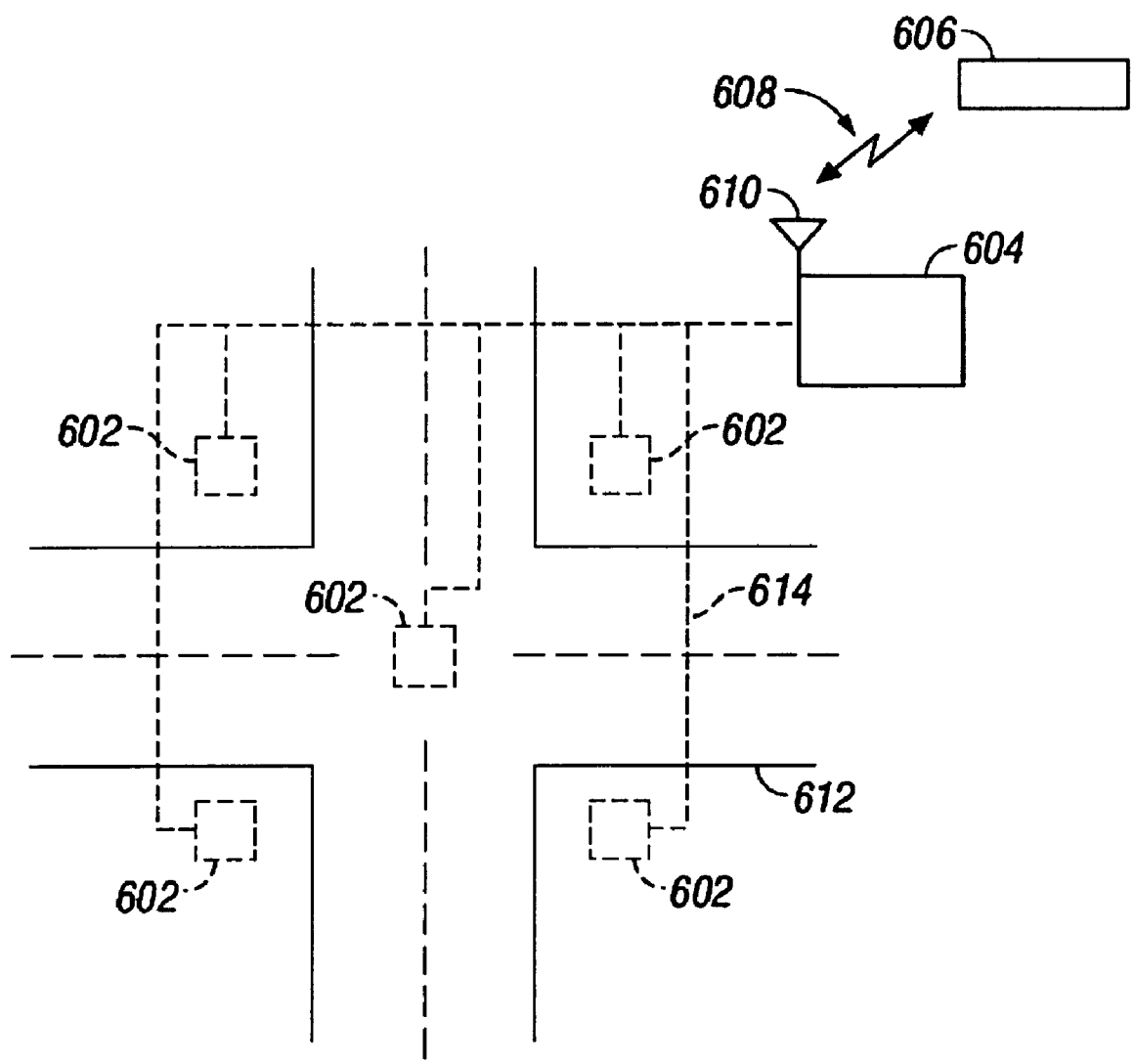
FIG. 6 schematically illustrates a traffic-monitoring apparatus as in various illustrative embodiments, according to the present disclosure.

FIG. 6 schematically illustrates a traffic-monitoring apparatus as in various illustrative embodiments, according to the present disclosure. FIG. 6 shows an exemplary application of the method 500 of motion-monitoring and/or the motion-monitoring system and/or apparatus 100 and/or the motion-monitoring system 400, according to various illustrative embodiments. Shown is a traffic-monitoring system 600. The traffic-monitoring system 600 may include several sensors 602, which may be ultra-wideband (UWB) sensors substantially as described and shown above. Each sensor 602 may be buried in a strategic location in and around a roadway 612. The roadway 612 is shown as an intersection and may be an in-ground barrier, for example. FIG. 1 also shows a sensor, the detector 102d, fixed within an in-ground barrier, for example, a sidewalk. As used herein, the term "in-ground barrier" may include any placement of the sensor 602 within the ground. The term may include any combination of natural and/or man-made materials. The term may include natural earth materials, such as sand, dirt, rock, and the like, and/or any combination thereof. The term may also include any man-made material used including concrete, asphalt, wood, and the like, and any combination of these and/or other man-made materials.

Each sensor 602 may be coupled to a local control station 604 via one or more communication links 614. The local control station 604 may be linked to a central command and monitoring station 606 via a central communication link 608. The central link 608 may be wired and/or wireless, using an antenna 610 as shown, for example. A recording device (not shown) in the central command and monitoring station 606 may record the received data for archival and/or retrieval purposes.

In practice, all the sensors 602 may work together to monitor motion above ground around the roadway 612 intersection. Direction, speed, relative size, and/or timing of vehicles entering the roadway 612 intersection may be easily monitored and/or recorded at the central command and monitoring station 606, for example. In the event of an accident, details of vehicle characteristics (such as shown in FIG. 3A, for example) leading up to the accident may be useful in determining the cause of the accident, for example.

The general concept of a traffic embodiment, as shown the traffic-monitoring system 600 in FIG. 6, for example, may be used in pedestrian traffic-monitoring (such as shown in FIG. 3B, for example). In one exemplary application, a motion-monitoring system 100, as shown in FIG. 1, for example, may be implemented in an office building. Such a motion-monitoring system 100 may help determine if personnel are still in the building after an evacuation order, for example. Furthermore, such a motion-monitoring system 100, according to various illustrative embodiments, and using a norm comparison 512 as in the method 500 as shown in FIG. 5, for example, may be used as an early warning system. For example, the detection of a crowd of people rushing from the building as compared to normal walking traffic may be indicative of an emergency.

Although various illustrative embodiments as described above may utilize an impulse signal, those of ordinary skill in the art having the benefit of the present disclosure will appreciate that alternative signals may be directly relevant. These alternative signals may include one or more of wide-band, swept continuous wave (CW), stepped CW, and/or coded pulse trains, and the like. Any radio-frequency (RF) sensor having one or more antennas buried in a barrier and being capable of transmitting and receiving signals through the barrier may suffice.

Referring to FIGS. 1-6, in operation various illustrative embodiments of the motion-monitoring apparatus 100, 200, system 100, 400, 600, and/or method 500 of the present invention may use the one or more implanted antennas to transmit one or more radio-frequency (RF) signals into the one or more volumes. The one or more radio-frequency (RF) signals may be reflected back to the one or more antennas and/or antenna pairs and/or antenna sets within the barrier. The one or more receiving antennas may transmit the one or more echo signals to one or more sensing circuits, which may or may not be collocated with the one or more receiving antennas and/or antenna pairs and/or antenna sets. One or more wired and/or wireless communication links may be used to transmit the one or more received signals to the one or more sensing circuits. The one or more sensing circuit may include one or more processors to perform filtering operations, but one or more simple sensing circuits may merely transmit the one or more echo signals in digital form to a central command and monitoring station for processing.

Data processing may be used to filter signals reflected from one or more stationary objects and/or pass signals returning from one or more moving objects. The filtering operation may be a subtraction process wherein successive signals are compared to previous signals returning from the same object. If the object is not moving, then the successive signal may be substantially equal to the previous signal, and subtracting the former from the latter may remove the stationary object signal. When the same comparison and subtraction process is performed on a moving target, then the result may be a signal having a distinguishable amplitude. The resultant signal may be amplified and/or transmitted to the monitoring station and/or monitor.

The signal may be further processed to estimate, distinguish, and/or determine other characteristics of the moving object. As shown in FIG. 3A and FIG. 3BA, for example, size, type (such as vehicle or human), direction of movement, location within the monitored volume, and/or speed may be exemplary characteristics of objects determinable using various illustrative embodiments. These characteristics may be used to determine vehicle and/or pedestrian traffic patterns, for example, as shown in FIG. 6.

In accordance with the present disclosure, a device, a system, and a method for using implantable sensors to detect moving objects in an area are disclosed. In various aspects, a device in accordance with the present disclosure may comprise means for using implantable sensors to detect moving objects in an area and means for enabling the means for using the implantable sensors to detect the moving objects in the area, both the means for using the implantable sensors to detect the moving objects in the area and the means for enabling the means for using the implantable sensors to detect the moving objects in the area covering corresponding structures and/or materials described herein and equivalents thereof.

In various other aspects, a system in accordance with the present disclosure may comprise means for using implantable sensors to detect moving objects in an area, means for enabling the means for using the implantable sensors to detect the moving objects in the area, and means for using the means for using the implantable sensors to detect the moving objects in the area, all of the means for using the implantable sensors to detect the moving objects in the area, the means for enabling the means for using the implantable sensors to detect the moving objects in the area, and the means for using the means for using the implantable sensors to detect the moving objects in the area covering corresponding structures and/or materials described herein and equivalents thereof. In various aspects, a method in accordance with the present disclosure may comprise steps for using implantable sensors to detect moving objects in an area and steps for enabling the steps for using the implantable sensors to detect the moving objects in the area, both the steps for using the implantable sensors to detect the moving objects in the area and the steps for enabling the steps for using the implantable sensors to detect the moving objects in the area covering corresponding acts described herein and equivalents thereof.

The particular embodiments disclosed above are illustrative only, as the present claimed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present claimed subject matter. In particular, every range of values (of the form, "from about a to about b," or, equivalently, "from approximately a to b," or, equivalently, "from approximately a-b") disclosed herein is to be understood as referring to the power set (the set of all subsets) of the respective range of values, in the sense of Georg Cantor. Accordingly, the protection sought herein is as set forth in the claims below.

What is claimed is:

1. A motion-monitoring apparatus comprising:
at least one antenna fixed within a barrier, the at least one antenna transmitting at least one first radio-frequency signal through the barrier to at least one volume outside the barrier, the at least one first radio-frequency signal reflecting from at least one object in the at least one volume to produce a plurality of second radio-frequency signals, the plurality of second radio-frequency signals being received by the at least one antenna;
at least one sensing circuit sensing the plurality of second radio-frequency signals, the at least one sensing circuit generating a plurality of time-domain output signals;
at least one processor receiving the plurality of time-domain output signals, the at least one processor comparing at least one successive time-domain output signal to at least one previous time-domain output signal to estimate at least one characteristic of the at least one object, the at least one characteristic including a motion of the at least one object; and
at least one monitor device remotely disposed from the at least one antenna, the at least one monitor device monitoring the at least one characteristic.

2. The motion-monitoring apparatus of claim 1, wherein the at least one sensing circuit includes at least one ultra-wideband sensing circuit.

3. The motion-monitoring apparatus of claim 2, wherein the plurality of time-domain output signals are generated using a sample-down process.

4. The motion-monitoring apparatus of claim 1, wherein the at least one antenna comprises a single antenna, the motion-monitoring apparatus further comprising at least one controllable switch switching the single antenna between a transmitting mode and a receiving mode.

5. The motion-monitoring apparatus of claim 1, wherein the at least one antenna includes a first antenna and a second antenna, the first antenna operating in a transmitting mode, the second antenna operating in a receiving mode.

6. The motion-monitoring apparatus of claim 1, wherein the at least one sensing circuit is collocated with the at least one antenna within the barrier.

7. The motion-monitoring apparatus of claim 1, wherein the barrier comprises at least one building member.

8. The motion-monitoring apparatus of claim 7, wherein the at least one building member comprises at least one of a wall, a floor, and a roof.

9. The motion-monitoring apparatus of claim 1, wherein the barrier comprises at least one in-ground barrier.

10. The motion-monitoring apparatus of claim 9, wherein the at least one in-ground barrier includes at least one of a natural earth ground material, asphalt, concrete, wood, water, drywall, and brick.

11. The motion-monitoring apparatus of claim 1, wherein the at least one characteristic comprises a plurality of characteristics, the plurality of characteristics further including at least one of a size of the at least one object, a type of the at least one object, a speed of the at least one object, a location of the at least one object, and a direction of movement of the at least one object.

12. The motion-monitoring apparatus of claim 1, further comprising:
at least one visual display device providing at least one visual output representative of the at least one characteristic.

13. The motion-monitoring apparatus of claim 2, further comprising:
at least one visual display device providing at least one visual output representative of the at least one characteristic.

14. The motion-monitoring apparatus of claim 1, wherein the at least one antenna comprises at least three antenna sets, each of the at least three antenna sets spaced apart from others of the at least three antenna sets, the at least one first radio-frequency signal comprises a plurality of first radio-frequency signals, and each of the at least three antenna sets transmitting a respective one of the plurality of first radio-frequency signals into the at least one volume and receiving a respective one of the plurality of second radio-frequency signals to provide at least one triangulation for estimating the at least one characteristic.

15. A motion-monitoring system comprising:
at least one sensor set including at least one antenna fixed within a barrier, the at least one antenna transmitting at least one first radio-frequency signal through the barrier to at least one volume outside the barrier, the at least one first radio-frequency signal reflecting from at least one object in the at least one volume to produce a plurality of second radio-frequency signals, the plurality of second radio-frequency signals being received by the at least one antenna, the at least one sensor set including at least one sensing circuit sensing the plurality of second radio-frequency signals, the at least one sensing circuit generating a plurality of time-domain output signals;

at least one processor receiving the plurality of time-domain output signals, the at least one processor comparing at least one successive time-domain output signal to at least one previous time-domain output signal to at least one of estimate at least one characteristic of the at least one object and distinguish at least one characteristic of the at least one object, the at least one characteristic including a motion of the at least one object;

at least one monitoring station remotely disposed from the at least one sensor set, the at least one monitor station monitoring the at least one characteristic; and at least one visual display device providing at least one visual output representative of the at least one characteristic.

16. The motion-monitoring system of claim 15, wherein the at least one volume is a plurality of volumes separated from each other, the at least one sensor set comprises a plurality of sensor sets, the at least one first radio-frequency signal comprises a plurality of first radio-frequency signals, the at least one sensing circuit comprises a plurality of sensing circuits, each of the plurality of volumes including a respective one of the plurality of sensor sets, the respective at least one antenna fixed within the respective barrier transmitting the respective one of the plurality of first radio-frequency signals and receiving the respective one of the plurality of second radio-frequency signals, and the respective one of the plurality of sensing circuits generating a plurality of time-domain output signals related to the respective one of the plurality of volumes, the motion-monitoring system further comprising:

a plurality of communication links, each of the plurality of communication links associated with the respective one of the plurality of sensing circuits for transmitting the respective plurality of time-domain output signals;

a hub receiving each of the respective plurality of time-domain output signals; and a central communication link transmitting the respective plurality of time-domain output signals from the hub to the monitoring station.

17. The motion-monitoring system of claim 15, wherein the barrier comprises at least one roadway, the at least one object comprises a plurality of objects, and the at least one monitored characteristic comprises at least one traffic pattern.

18. The motion-monitoring system of claim 17, wherein the plurality of objects includes at least one of a plurality of vehicles and a plurality of pedestrians.

19. A method of motion-monitoring comprising:

transmitting at least one first radio-frequency signal through a barrier to at least one volume outside the barrier using at least one antenna fixed within the barrier, the at least one first radio-frequency signal reflecting from at least one object in the at least one volume to produce a plurality of second radio-frequency signals;

receiving the plurality of second radio-frequency signals with the at least one antenna;

generating a plurality of time-domain output signals using at least one sensing circuit sensing the plurality of second radio-frequency signals;

comparing at least one successive time-domain output signal to at least one previous time-domain output signal to estimate at least one characteristic of the at least one object using at least one processor receiving the plurality of time-domain output signals, the at least one characteristic including a motion of the at least one object; and monitoring the at least one characteristic using at least one monitor device remotely disposed from the at least one antenna.

20. The method of motion-monitoring of claim 19, wherein the at least one antenna comprises at least three antenna sets, each of the at least three antenna sets spaced apart from others of the at least three antenna sets, the at least one first radio-frequency signal comprises a plurality of first radio-frequency signals, the method of motion-monitoring further comprising:

transmitting a respective one of the plurality of first radio-frequency signals into the at least one volume; and receiving a respective one of the plurality of second radio-frequency signals using a respective one of the at least three antenna sets to provide at least one triangulation for estimating the at least one characteristic.

* * * * *